(12) United States Patent
Hedlund et al.

(10) Patent No.: US 12,185,797 B2
(45) Date of Patent: Jan. 7, 2025

(54) FASTENING DEVICE FOR A SUPPORT ARM

(71) Applicant: FUMEX AB, Skellefteå (SE)

(72) Inventors: Lars Hedlund, Skellefteå (SE); Gustav Stenberg, Skellefteå (SE)

(73) Assignee: FUMEX AB, Skellefteå (SE)

( * ) Notice: Subject to any disclaimer, the term of this patent is extended or adjusted under 35 U.S.C. 154(b) by 416 days.

(21) Appl. No.: 17/361,215

(22) Filed: Jun. 28, 2021

(65) Prior Publication Data

US 2022/0000279 A1    Jan. 6, 2022

(30) Foreign Application Priority Data

Jul. 1, 2020  (SE) .................................... 2050818-0

(51) Int. Cl.
*A44B 13/00*    (2006.01)

(52) U.S. Cl.
CPC ................................... *A44B 13/00* (2013.01)

(58) Field of Classification Search
CPC ....... A44B 13/00; F16B 5/121; B08B 15/002; B08B 15/00
USPC ...... 248/75, 79, 53, 62, 63, 74.2, 74.1, 74.5, 248/88, 86, 84, 227.1, 230.7, 316.7, 80, 248/89; 454/63, 65
See application file for complete search history.

(56) References Cited

U.S. PATENT DOCUMENTS

| | | | | |
|---|---|---|---|---|
| 622,246 | A | * | 4/1899 | Matheas .................... E04C 5/10 294/154 |
| 1,897,248 | A | * | 2/1933 | Ferguson ................. F16L 3/003 248/312 |
| 2,748,236 | A | * | 5/1956 | Landis .................... B23K 9/287 248/75 |
| 3,050,801 | A | * | 8/1962 | Downey ............... F16L 37/008 285/244 |
| 3,178,070 | A | * | 4/1965 | Leland .................... E03D 9/005 222/394 |

(Continued)

FOREIGN PATENT DOCUMENTS

| | | |
|---|---|---|
| DE | 3225953 A1 | 1/1984 |
| DE | 202016100035 U1 | 1/2016 |

(Continued)

OTHER PUBLICATIONS

Extended European Search Report received for EP Application No. 21180619.5, dated Oct. 27, 2021.

(Continued)

*Primary Examiner* — Kimberly T Wood
(74) *Attorney, Agent, or Firm* — MARSHALL, GERSTEIN & BORUN LLP

(57) ABSTRACT

A fastening device configured to be mounted to an elongated profile element of a support arm arrangement, and a method of mounting said fastening device to a support arm arrangement. The support arm arrangement exhibits a cross-sectional profile shape, and the fastening device is configured to hold a tubing member by a holding element, configured to be coupled to the fastening device and to the tubing member. The fastening device includes a contour surface at least partly corresponding with said cross-sectional profile shape, wherein the contour surface is configured for engaging and retaining the fastening device to the elongated profile element when the fastening device is mounted to the elongated profile element.

11 Claims, 5 Drawing Sheets

(56) References Cited

U.S. PATENT DOCUMENTS

| | | | | |
|---|---|---|---|---|
| 3,882,886 | A | * | 5/1975 | Ely .................. F16L 3/015 280/421 |
| 3,941,412 | A | * | 3/1976 | Carpenter ............. B66C 1/16 294/151 |
| 5,067,679 | A | * | 11/1991 | Courtney ............. F16L 3/26 248/75 |
| 5,211,602 | A | * | 5/1993 | Holmgren .......... F16L 27/0857 285/38 |
| 6,003,819 | A | * | 12/1999 | Hall ................. F16L 3/26 248/80 |
| 6,893,067 | B1 | * | 5/2005 | Ayala ................ E04G 21/04 294/157 |
| 7,926,768 | B2 | * | 4/2011 | Prest ................. E03F 1/008 248/83 |
| 8,382,047 | B1 | * | 2/2013 | Hildebrand ........... F16L 3/003 248/316.4 |
| 9,797,423 | B2 | | 10/2017 | Curiel Montoya et al. |
| 2005/0252336 | A1 | | 11/2005 | Coral et al. |
| 2007/0210215 | A1 | * | 9/2007 | Prest ................. E03F 1/008 248/80 |
| 2014/0259620 | A1 | * | 9/2014 | Hicks ................ F16L 3/233 29/525.01 |
| 2018/0153300 | A1 | | 6/2018 | Westcott et al. |

FOREIGN PATENT DOCUMENTS

| | | |
|---|---|---|
| EP | 0567442 A1 | 10/1993 |
| EP | 3550291 A1 | 10/2019 |
| WO | WO-03100313 A1 | 12/2003 |
| WO | WO-2014098791 A1 | 6/2014 |
| WO | WO-2019235990 A1 | 12/2019 |

OTHER PUBLICATIONS

Swedish Search Report received for SE Application No. 2050818-0, dated Dec. 15, 2020.

European Office Action received for European Application No. 21180619.5 dated Aug. 30, 2023.

\* cited by examiner

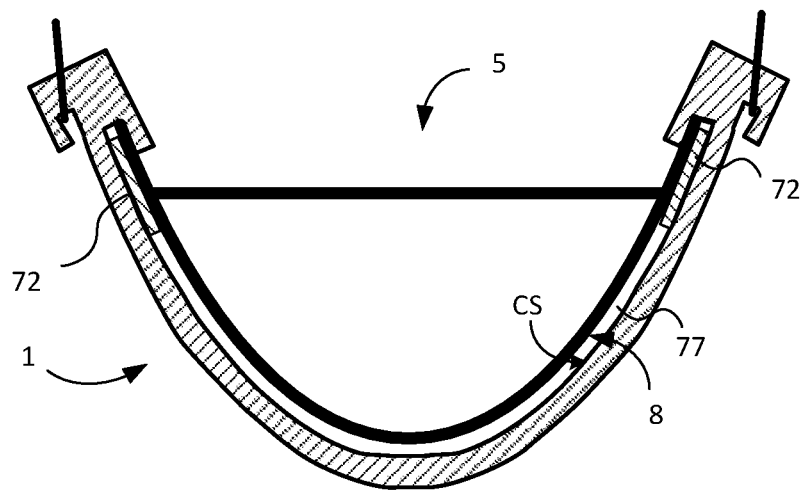
FIG. 7
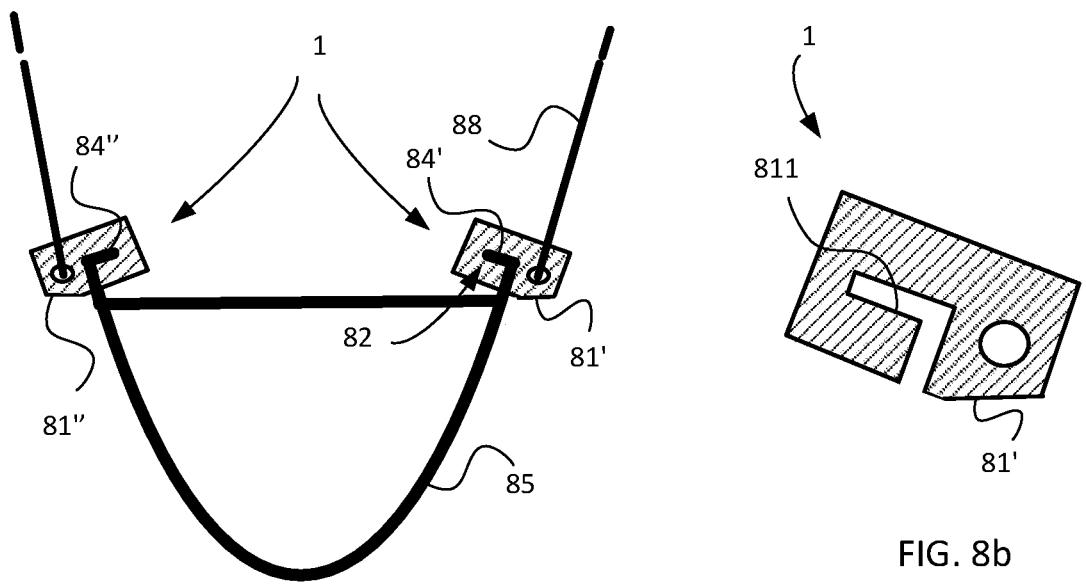
FIG. 8a
FIG. 8b

FASTENING DEVICE FOR A SUPPORT ARM

TECHNICAL FIELD

The present invention relates to a fastening device configured to be mounted to a support arm arrangement and for holding a tubing member. The present invention also relates to an extraction apparatus making use of such a fastening device. The present invention also relates to a method of mounting the fastening device and/or the tubing member to the support arm arrangement.

The present invention may concern different types of extraction apparatuses and support arm arrangements, to which various types of tubing members can be mounted for the extraction of gaseous fluids.

The present invention may concern the industry manufacturing extraction apparatuses and/or ventilation arrangements designed for capturing gases or may concern the industry using support arm arrangements configured to hold tubing members adapted to capture gaseous fluid, such as airborne particulates, odours, smoke, welding fume, dusts, vapours or other gaseous fluids.

The present invention may concern the industry producing fastening devices configured to be mounted to support arm arrangements of extraction apparatuses.

BACKGROUND

Current extraction apparatuses comprising tubing members configured to extract gaseous fluids may lack sufficient means for safe and quick assembly and disassembly of the tubing member to the support arm arrangement.

In food producing and food handling process and production, extraction apparatuses are used for providing sufficient air distribution and proper handling of airborne particulates, odours etc. The components (such as fastening devices, tubing members, elongated profile elements etc.) of the extraction apparatus are regularly cleaned for preventing contamination of the components for achieving high standard of hygiene related to extraction apparatuses and fastening devices. Today, such cleaning may involve time consuming assembly and disassembly of the fastening device to the support arm arrangement and may involve unnecessary disrupting production and costs.

Some industries manufacturing extraction apparatuses make use of welding for joining the fastening device to the support arm arrangement. However, the welding joints are difficult to clean and contaminations may be caught in uneven surfaces and deep craters of the welding joint.

Extraction apparatuses may also be used in other processes for providing sufficient air distribution and proper handling of airborne particulates, odours etc.

Swedish patent application SE 1850702-0 (to Fumex AB) discloses a support arm arrangement of a gas extraction apparatus making use of fastening devices and resilient holding elements for holding a tubing member to the support arm arrangement. A free end of each resilient holding element is coupled to the fastening device and being stretched around the tubing member back to the fastening device. The fastening device and extraction apparatus shown in SE 1850702-0 works well, but is subject to research and development.

SUMMARY OF THE INVENTION

There is an object to provide a fastening device configured to be mounted to a support arm arrangement that promotes simple, safe and rigid mounting of a tubing member to the support arm arrangement.

There is an object to provide a fastening device promoting quick assembly and disassembly of the tubing member to/from the support arm arrangement in a cost-effective way allowing maintenance or cleaning without disrupting production and with a minimum of downtime.

There is an object to provide a rigid assembly of the tubing member to the support arm arrangement preventing the tubing member to unintentionally slide along the elongated profile element during use of the extraction apparatus.

There is an object to provide an ergonomic and/or safe mount of the fastening device to the support arm arrangement.

There is an object to eliminate the risk of sparking between the support arm arrangement and the fastening device during use of the extraction apparatus.

There is an object to provide an improved fastening device and extraction apparatus that is easy and safe to operate contributing to an optimally ergonomic environment.

There is an object to provide a fastening device configured to hold a tubing member configured for capture of e.g. gases, such as airborne particulates, odours, smoke, welding fume, dusts, vapours or other gaseous fluids.

There is an object to provide an improved fastening device and extraction apparatus, for overcoming eventual drawbacks of prior art.

This or at least one of said objects has been solved by a fastening device configured to be mounted to an elongated profile element of a support arm arrangement exhibiting a cross-sectional profile shape, the fastening device is configured to hold a tubing member by means of a holding element, configured to be coupled to the fastening device and to the tubing member. The fastening device comprises a contour surface having a contour at least partly corresponding with said cross-sectional profile shape of the elongated profile element, wherein the contour surface is configured for engaging and retaining the fastening device to the elongated profile element when the fastening device is mounted to the elongated profile element.

In such way there is provided a self-retaining fastening device configured to be retained to the elongated profile element permitting ergonomic and/or safe mount of the tubing member to the support arm arrangement.

In such way there is provided a fastening device configured for quick and secure mount of a tubing member to a support arm arrangement and configured to rigidly hold the tubing member to the support arm arrangement.

In such way there is provided a fastening device promoting quick assembly and disassembly of the tubing member to/from the support arm arrangement allowing maintenance or cleaning of the support arm arrangement and tubing member without disrupting production and with a minimum of downtime.

In such way is achieved that an operator can mount the tubing member to/from the support arm arrangement with one hand for simple and safe coupling.

Alternatively, the contour surface exhibits a first curvature having a first radius when the fastening device is in undeformed state.

Alternatively, the elongated profile element of the support arm arrangement exhibits a second curvature in crosssection having a second radius that is larger than the first radius.

Alternatively, the contour surface exhibits a shape configured to clamp around the support arm arrangement and/or exhibits a shape contour shape configured to embrace the cross-sectional profile shape of the support arm arrangement.

In such way a hollow elongated profile element constituting a structural part of the support arm arrangement can be used.

In such way there is provided a light and rigid support arm having a hermetically sealed cavity.

The hollow elongated profile element does not have to be machined with any bore or through hole for screwing a fastening device (such as a tube holding bracket) to the hollow elongated profile element, which bore or through hole would reach the cavity of the profile element and involving the risk of contamination of the cavity.

It is of high importance that the cavity of the hollow elongated profile element is hermetically closed, as contaminations otherwise would enter the cavity and it is difficult to clean.

By providing a hollow elongated profile element there is achieved a light and high strength elongated profile element that resists against bending deformation.

In such way there is achieved an extraction apparatus promoting cost-effective service and maintenance.

The present invention promotes the use of a hermetically closed hollow elongated profile element, which is of high strength and light at the same time as the hollow elongated profile element can be used in clean environment and promotes easy and cost-effective mounting and demounting of the tubing member.

Alternatively, the contour surface exhibits a first gripping surface configured for said retaining and engaging of the fastening device to the support arm arrangement.

Alternatively, the contour surface exhibits a second gripping surface configured for said retaining and engaging of the fastening device to the support arm arrangement.

This implies that the durability and reliability of the fastening device can be improved.

Alternatively, the fastening device is formed with a first hook member comprising the first gripping surface, which first hook member is configured to engage a first flange of the cross-sectional profile shape.

Alternatively, the fastening device is formed with a second hook member comprising the second gripping surface, which second hook member is configured to engage a second flange of the cross-sectional profile shape.

Alternatively, the contour surface exhibits a first slot configured to receive a first flange of the cross-sectional profile.

Alternatively, the contour surface exhibits a second slot configured to receive a second flange of the cross-sectional profile.

Alternatively, the first gripping surface of the first hook member is configured to engage a free first lip end section of the cross-sectional profile.

Alternatively, the second gripping surface of the second hook member is configured to engage a free second lip end section of the cross-sectional profile.

Alternatively, the contour surface of the fastening device is a contour surface that is configured to engage and retain the fastening device to the support arm arrangement and/or is provided with a first clip member and/or snap-fit clamping joint member configured for engaging and retaining the fastening device to the support arm arrangement.

Alternatively, a snap-fit clamping joint feature of the contour surface is configured to engage and retain the fastening device to the support arm arrangement and may be part of a coupling member of the fastening device.

Alternatively, the fastening device is made of a deformable material configured to flex outward when the fastening device is clamped onto the cross-sectional profile.

Alternatively, the contour surface is provided with a second clip member and/or snap-fit clamping joint member configured for engaging and retaining the fastening device to the support arm arrangement.

Alternatively, the first clip member and/or snap-fit clamping joint member is arranged at a first end of the fastening device.

Alternatively, the second clip member and/or snap-fit clamping joint member is arranged at a second end of the fastening device.

Alternatively, the first clip member and/or snap-fit clamping joint member is an integrated portion of the fastening device.

Alternatively, the second clip member and/or snap-fit clamping joint member is an integrated portion of the fastening device.

Alternatively, the support arm arrangement is elongated and formed along a central axis and comprises an elongated profile element extending along the central axis and exhibiting a cross-sectional profile in the form of; U-shape, Omega-shape, hat-profile shape, I-shape, box-shape, L-shape, U-shaped channel, C-shaped channel, Ω-shaped channel profile or other suitable profile form in cross-section, which cross-sectional profile exhibits said cross-sectional profile shape.

Alternatively, the elongated profile element exhibits a first and/or a second elongated cut edge extending along the prolongation of the elongated profile element.

Alternatively, the first and/or the second elongated cut edge runs along said prolongation within a first and/or second edge section of the elongated profile element.

Alternatively, the fastening device is configured as a bracket having a profile formed in; U-shape, Omega-shape, hat-profile shape, I-shape, box-shape, L-shape, U-shaped channel, C-shaped channel, Ω-shaped channel profile or other suitable profile or outline in cross-section.

Alternatively, the contour surface of the fastening device at least partly corresponds with the shape of the cross-sectional profile of the support arm arrangement and comprises a first retaining portion configured to engage the first elongated cut edge of said first elongated cut edge of the elongated profile element.

Alternatively, the contour surface at least partly corresponds with the cross-sectional profile shape of the support arm arrangement and comprises a second retaining portion configured to engage a second elongated cut edge of said second elongated cut edge of the elongated profile element.

Alternatively, the fastening device exhibits an inner contour surface at least partly facing the elongated profile element of the support arm arrangement, when mounted.

Alternatively, the fastening device exhibits an outer contour surface at least partly facing away from the elongated profile element of the support arm arrangement, when mounted.

Alternatively, the elongated profile element exhibits said first and/or second flange portion extending along the support arm arrangement and along the prolongation of the elongated profile element.

Alternatively, the first flange portion comprises the first elongated cut edge.

Alternatively, the second flange portion comprises the second elongated cut edge.

Alternatively, the first and/or second flange portion being formed integrally with the elongated profile element.

Alternatively, the elongated profile element is made hollow and comprises a cavity extending along the central axis.

Alternatively, an elongated stiffening wall or an elongated stiffening web portion is joined to the first flange portion.

Alternatively, the elongated stiffening wall or the elongated stiffening web portion is joined to the second flange portion for stiffening the first and the second flange portion of the elongated profile element.

Alternatively, the elongated stiffening wall or the elongated stiffening web portion extends along or parallel with the central axis.

Alternatively, the first flange portion and the second flange portion together form a U-shaped channel profile, an Omega-shape channel profile, a hat-profile shaped profile, an L-shaped profile, H-shaped profile, C-shaped channel profile, an open box section profile, an open round section profile or other.

Alternatively, the cavity is formed by an interior side of the elongated stiffening wall and by a respective interior side of the first flange portion and the second flange portion.

Alternatively, the contour surface of the fastening device at least partly or fully corresponds with a cross-sectional profile shape of the support arm arrangement, which cross-sectional profile shape and/or the contour surface is configured to engage and retain the fastening device to the support arm arrangement.

Alternatively, the cross-sectional profile shape exhibits an outer shape or inner shape that partly or fully corresponds with the contour surface of the fastening device.

Alternatively, the cross-sectional profile shape exhibits an outer shape in cross-section that is at least in one portion wider than the extension of the contour surface of the fastening device.

Alternatively, the elongated stiffening wall or the elongated stiffening web portion is joined to and arranged between the first elongated cut edge and the second elongated cut edge.

Alternatively, a first end line segment of the elongated stiffening wall or the elongated stiffening web portion is arranged adjacent the first elongated cut edge for leaving a free first lip end section of the first flange portion, which free first lip end section protrudes from the first end line segment of the elongated stiffening wall or the elongated stiffening web portion.

Alternatively, a second end line segment of the elongated stiffening wall or the elongated stiffening web portion is arranged adjacent the second elongated cut edge for leaving a free second lip end section of the second flange portion, which free second lip end section protrudes from the second end line segment of the elongated stiffening wall or the elongated stiffening web portion.

Alternatively, the respective first and second end line segment extend along the prolongation of the elongated profile element.

Alternatively, the free first lip end section protrudes from an exterior of the elongated stiffening wall or the elongated stiffening web portion, within a first area defined by the first end line segment.

Alternatively, the free second lip end section protrudes from said exterior of the elongated stiffening wall or the elongated stiffening web portion, within a second area defined by the second end line segment.

Alternatively, the first retaining portion of the fastening device is configured to engage the free first lip end section of the elongated profile element.

Alternatively, the second retaining portion of the fastening device is configured to engage the free second lip end section of the elongated profile element.

Alternatively, the first retaining portion of the fastening device comprises a first press fit clamping feature adapted to provide a first form fit coupling.

Alternatively, the second retaining portion of the fastening device comprises a second press fit clamping feature adapted to provide a first form fit coupling.

Alternatively, the first retaining portion is configured for interference fit and/or friction fit with the free first lip end section of the elongated profile element providing a first joint.

Alternatively, the second retaining portion is configured for interference fit and/or friction fit with the free second lip end section of the elongated profile element providing a second joint.

Alternatively, the first retaining portion is configured for gripping action due to back-spring property of the first retaining portion relative the other portion of the fastening device, wherein the gripping action acts between the first retaining portion and the free first lip end section.

Alternatively, the second retaining portion is configured for gripping action due to back-spring property of the second retaining portion relative the remaining part of the fastening device, wherein the gripping action acts between the second retaining portion and the free first lip end section.

Alternatively, the elongated profile element comprises plastic and/or metal material and/or other suitable material.

Alternatively, the first and/or second flange portion comprises the same material as that of the elongated profile element.

Alternatively, the elongated profile element is configured as a structural profile configured to carry the tubing member and/or a gas extraction unit.

Alternatively, the fastening device comprises a first coupling member configured to be releasable coupled to a first coupling element of the holding element.

Alternatively, the fastening device comprises a second coupling member configured to be releasable coupled to a second coupling element of the holding element.

Alternatively, the first retaining portion and/or second retaining portion of the fastening device is oriented relative each other in such way that proper alignment of the holding element relative the tubing member is achieved, when the holding element is coupled to the first coupling member and to the second coupling member and enclosing an envelope surface of the tubing member.

Alternatively, an envelope surface of the tubing member having at least a helical rill encircling the tubing member.

Alternatively, the holding member, when mounted, encloses the tubing member along the helical rill of the envelope surface of the tubing member.

Alternatively, the tubing member is configured as a flexible and/or corrugated conduit tube.

Alternatively, the tubing member is configured for ATEX-approved application (EU directive Appareils destinés à être utilisés en ATmosphères EXplosives) or for other explosive gas extraction application.

Alternatively, the tubing member comprises an exhaust channel.

Alternatively, the tubing member is coupled to an extraction nozzle for extraction and capture of gaseous fluids.

Alternatively, the support arm arrangement and/or the elongated profile element comprises composite matrix material, steel, aluminium or any other suitable material or combinations thereof.

Alternatively, the fastening device is made of conductive material or made of non-conductive material or made of combinations thereof.

Alternatively, the fastening device is entirely or partly made of lightweight material, such as aluminium or composite matrix, or is made of any other metal material.

Alternatively, the support arm arrangement exhibiting a hollow cross-sectional profile.

Alternatively, the coupling between the shape of the cross-sectional profile of the support arm arrangement and the inner contour surface of the fastening device exhibits a frictional interface by means of any suitable friction material or high friction material.

Alternatively, the friction material comprises rubber, anti-slip elements, ceramic material or other high friction material configured for dry frictional contact.

In such way is achieved that the fastening device is prevented from slippage along the support arm arrangement.

Alternatively, the contour surface of the fastening device comprises a friction member, such as a rubber pad, anti-slip rubber tape, or other suitable friction member comprising said friction material.

Alternatively, the contour surface of the fastening device comprises a surface of non-conductive material for avoiding sparking between the support arm arrangement and the fastening device.

Alternatively, said friction material comprises at least partially a conductive material for providing electrical contact between the support arm arrangement and the fastening device.

Alternatively, the support arm arrangement is part of a local gas extractor, wherein the tubing member is configured for extraction of gases.

Alternatively, the first coupling member comprises a first hook member.

Alternatively, the second coupling member comprises a second hook member.

Alternatively, the first coupling element comprises a first loop member.

Alternatively, the second coupling element comprises a second loop member.

Alternatively, the first coupling member comprises a first loop member.

Alternatively, the second coupling member comprises a second loop member.

Alternatively, the first coupling element comprises a first hook member.

Alternatively, the second coupling element comprises a second hook member.

Alternatively, the first coupling element and/or second coupling element of the holding element is/are integral part/parts of the holding elements.

Alternatively, the holding element comprises a flexible material.

Alternatively, the holding element comprises a rubber band, an O-ring, a flexible enclosing strap, a belt band or other holding element suitable to enclose the tubing member when holding the tubing member.

Alternatively, the holding element exhibits a curvature corresponding with the radius of curvature of the tubing member taken in transversal cross-section and exhibits an extension in a plane substantially or fully corresponding with a plane extending transverse to the prolongation of the tubing member when holding the tubing member.

Alternatively, the holding element is configured to be adjustable for suitable fitting and adaption to the tubing member.

Alternatively, the holding element comprises a resilient material and is configured to be stretchable and to resume former size or shape when demounted.

Alternatively, the holding element is configured to be coupled to the tubing member by partly or fully enclosing an envelope surface of the tubing member.

Alternatively, the holding element is an integral part of the fastening device and/or is permanently coupled to the fastening device whereas the first coupling element of the holding element is a free end of the holding element.

Alternatively, the holding element comprises at least a first coupling portion configured to be coupled to the tubing member and to the fastening device.

Alternatively, the holding element is a separate part comprising a first and second coupling portion, each configured to be coupled to the fastening device.

Alternatively, the fastening device is configured to firmly hold the tubing member to the support arm arrangement by means of the holding element.

Alternatively, the fastening device features a straight (when undeformed) and/or curved shape along its extension.

Alternatively, the curved shape corresponds with a mating curvature of the cross-sectional profile shape of the support arm arrangement.

Alternatively, the fastening device is configured to snugly embrace the elongated profile element when mounted.

Alternatively, the holding element is adjustable and/or stretchable configured to snugly embrace the tubing member.

Alternatively, the holding element comprises stretchable straps configured to be coupled to the first coupling member and/or second coupling member.

Alternatively, the holding element comprises elastic straps for wrapping across the envelope surface of the tubing member.

Alternatively, the holding element is configured to be coupled (at least one portion of the holding element may be permanently coupled to and/or integral with the fastening device) to the fastening device and to the tubing member via the first coupling member and/or second coupling member.

In such way is achieved a secure fastening device that is easy to mount and demount to the support arm arrangement in a secure and easy way.

In such way is achieved a secure fastening device that is cost-effective to manufacture and mount to and demount from the support arm arrangement.

Thereby is achieved that the fastening device and the tubing member can be demounted in a cost-effective manner for cleaning.

Thereby is achieved that the tubing member is easy to mount to the support arm arrangement.

This or at least one of said objects has been solved by a method of mounting a fastening device to a support arm arrangement, wherein the fastening device is configured to be mounted to an elongated profile element of a support arm arrangement exhibiting a cross-sectional profile shape, the fastening device is configured to hold a tubing member by means of a holding element, configured to be coupled to the fastening device and to the tubing member; the fastening device comprises a contour surface at least partly corresponding with said cross-sectional profile shape, wherein the contour surface is configured for engaging and retaining the fastening device to the elongated profile element when the fastening device is mounted to the elongated profile element, the method comprises the steps of; providing the fastening device; mounting the fastening device to the elongated profile element by engaging the contour surface to the elongated profile element, the contour surface being configured to retain the fastening device to the elongated profile element; and coupling the holding element to the tubing member and to the fastening device.

Alternatively, the method comprises the further step of leading the fastening device over a free end of the elongated profile element.

Alternatively, the method comprises the further step of sliding the fastening device along the elongated profile element into position.

Alternatively, the method comprises the further step of mounting the fastening device to the elongated profile element comprises snapping the fastening device to the elongated profile element.

Alternatively, the method comprises a step of coupling a first end of the holding element to the fastening device.

Alternatively, the method comprises a step of encircling the holding element around an envelope surface of the tubing member.

Alternatively, the method comprises a step of encircling the holding element around the tubing member in an imaginary plane oriented transverse or substantially transverse a longitudinal direction of the tubing member.

Alternatively, the envelope surface of the tubing member comprises at least one helical rill encircling the tubing member, wherein the holding element, when mounted, encloses the tubing member along the at least one helical rill.

Alternatively, the method comprises a step of coupling a second end of the holding element to the fastening device.

The tubing member may be defined as a tube, hose, pipe, channel, conduit, duct, leader, line or other.

Alternatively, the curvature of the cross-sectional profile shape (or the curvature of the cross-sectional profile shape) of the elongated profile element or outer shape of the elongated profile element corresponds with the contour surface of the fastening device.

Alternatively, the cross-sectional profile shape fully or partially corresponds with the shape of the elongated profile element.

Alternatively, the cross-sectional profile shape may be defined and/or outlined by a cross-sectional section taken transverse a central axis running along the prolongation of the elongated profile element.

Alternatively, the holding element is an integral part of the fastening device and/or is permanently coupled to the fastening device whereas the first coupling element of the holding element is provided at a free end of the holding element.

The fastening device may be defined as a bracket, a catch, a grip, a lock, a nipper fit, a press fit, a snap fit or other.

The holding element may be defined as a strap, a belt, a band, a tie, chain, rubber band, O-ring, elastomer strip or other.

BRIEF DESCRIPTION OF THE DRAWINGS

The present invention will now be described by way of examples with references to the accompanying schematic drawings, of which:

FIG. 7 illustrates a fastening device according to a sixth example;

FIGS. 8a-8b illustrate fastening devices according to a seventh example;

DETAILED DESCRIPTION

Hereinafter, exemplary embodiments of the present invention are described with reference to the accompanying figures, wherein for the sake of clarity and understanding of the invention some details of no importance may be deleted from the drawings.

Figure 1:
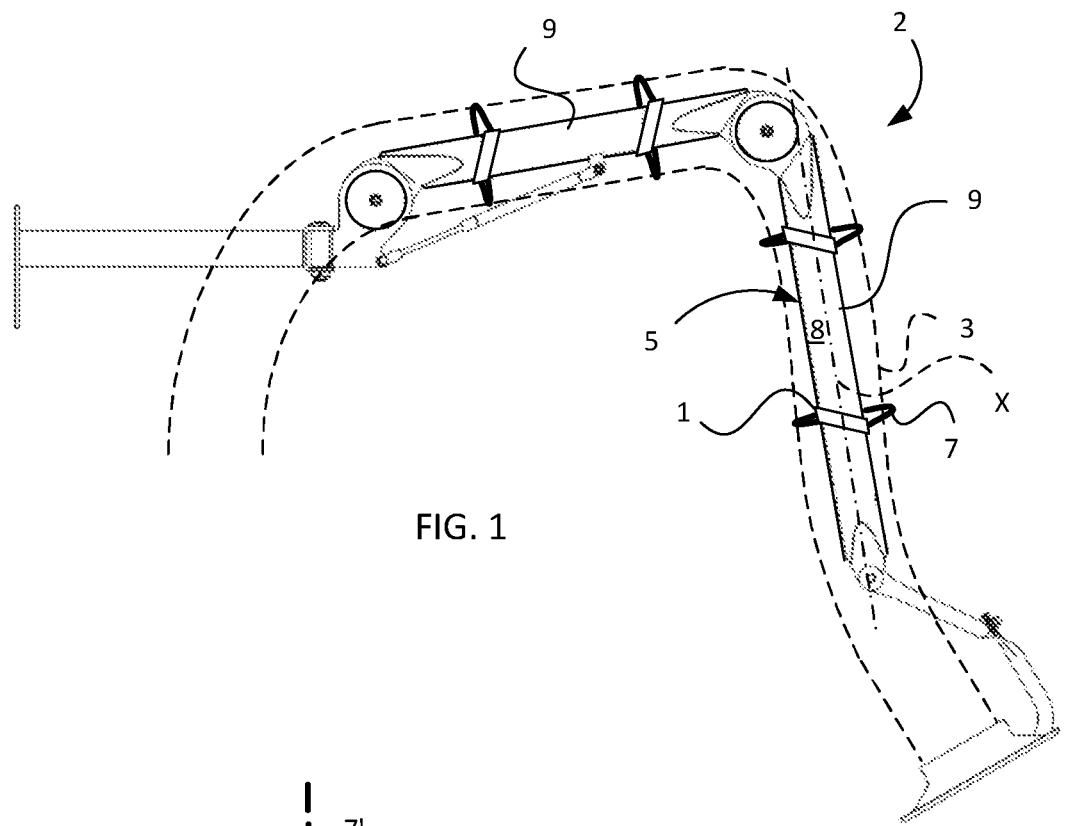
FIG. 1 illustrates a part of a gas extractor comprising a tubing member mounted to a support arm arrangement according to a first example.

FIG. 1 illustrates a part of a gas extractor 2 comprising a tubing member 3 mounted to a support arm arrangement 5 according to a first example. FIG. 1 illustrates a fastening device 1 configured to be mounted to the support arm arrangement 5. The support arm arrangement 5 comprises a cross-sectional profile shape 8 partially mating with a contour surface (not shown, e.g. see reference sign 11 in FIG. 2b) of the fastening device 1, when the fastening device 1 is mounted to an elongated profile element 9 of the support arm arrangement 5. The fastening device 1 is configured to hold the tubing member 3 by means of a holding element 7, such as an elastic strap or other suitable band.

The cross-sectional profile shape 8 may be defined and/or outlined by a cross-sectional section taken transverse a central axis X running along the prolongation of the elongated profile element 9.

The contour surface of the fastening device 1 at least partially corresponds with the cross-sectional profile shape 8 of the elongated profile element 9 of the support arm arrangement 5. The contour surface is configured for engaging and retaining the fastening device 1 to the elongated profile element 9 when the fastening device 1 is mounted to the elongated profile element 9.

The holding element 7 is configured to be coupled to the fastening device 1 and is configured to be coupled to the tubing member 3 for holding the tubing member 3 to the support arm arrangement 5 (e.g. by wrapping the holding element 7 around the tubing member 3).

Figure 2A:
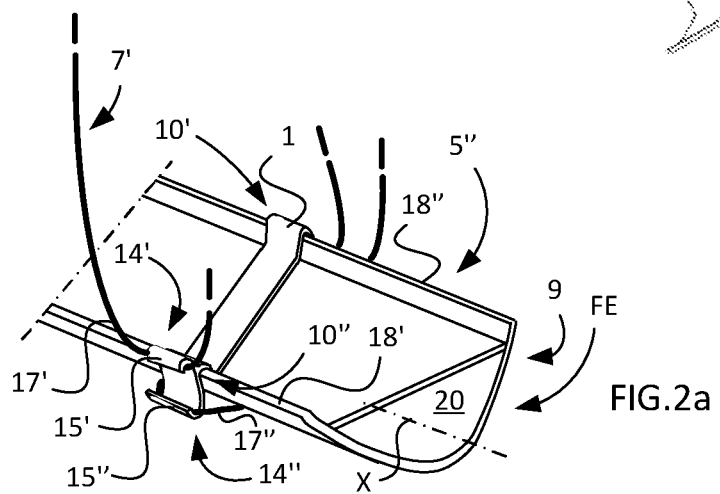
FIG. 2a illustrates in a perspective view a fastening device mounted to a support arm arrangement according to a second example.

FIG. 2a illustrates a fastening device 1 mounted to an elongated profile element 9 of a support arm 5" according to a second example. The fastening device 1 exhibits a contour surface (see ref. 11 in FIG. 2b) facing the support arm 5" that is configured to engage and retain the fastening device 1 to the support arm 5" and is provided with a first and second snap-fit clamping joint 10', 10" configured for engaging and retaining the fastening device 1 to the support arm 5". The fastening device 1 comprises a first coupling 14' in the shape of a first hook 15' configured to be releasable coupled to a first loop 17' of e.g. an elastic tube holding strap 7' configured to hold an exhaust tubing (not shown) to the support arm 5". The fastening device 1 further comprises a second coupling 14" in the shape of a second hook 15" configured to be releasable coupled to a second loop 17" of the elastic tube holding strap 7' configured to hold said exhaust tubing to the support arm 5". The elongated profile element 9 is made hollow and comprises a cavity 20 extending along the central axis X.

Alternatively, the first and second snap-fit clamping joint 10', 10" may be configured as sliding portions configured to mate a first and a second elongated cut edge 18',18" of the elongated profile element 9 and extending along the prolongation of the elongated profile element 9. The fastening device 1 is in this case mounted onto the elongated profile element 9 by leading the fastening device 1 over a free end FE of the elongated profile element 9 and sliding the fastening device 1 along the elongated profile element 9 into position.

Figure 2B:
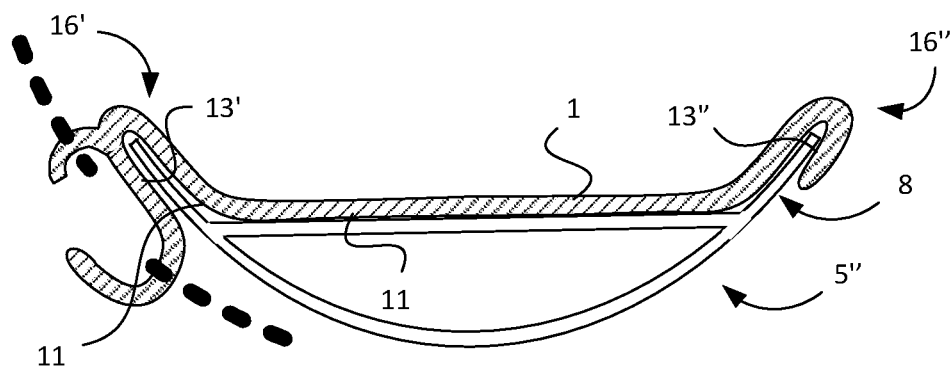
FIG. 2b illustrates the fastening device and the support arm arrangement shown in FIG. 2a in cross-section.

FIG. 2b illustrates in cross-section the fastening device 1 and the support arm 5" shown in FIG. 2a. The fastening device 1 comprises a contour surface 11, facing the cross-sectional profile shape 8 and exhibiting a shape configured to fit and partially embrace the cross-sectional profile shape 8 of the support arm 5". The contour surface 11 of the fastening device 1 exhibits a first and second gripping surface 13', 13" of a respective first hook 16' and a second hook 16" configured for retaining and engaging of the fastening device 1 to the support arm 5".

Figure 3:
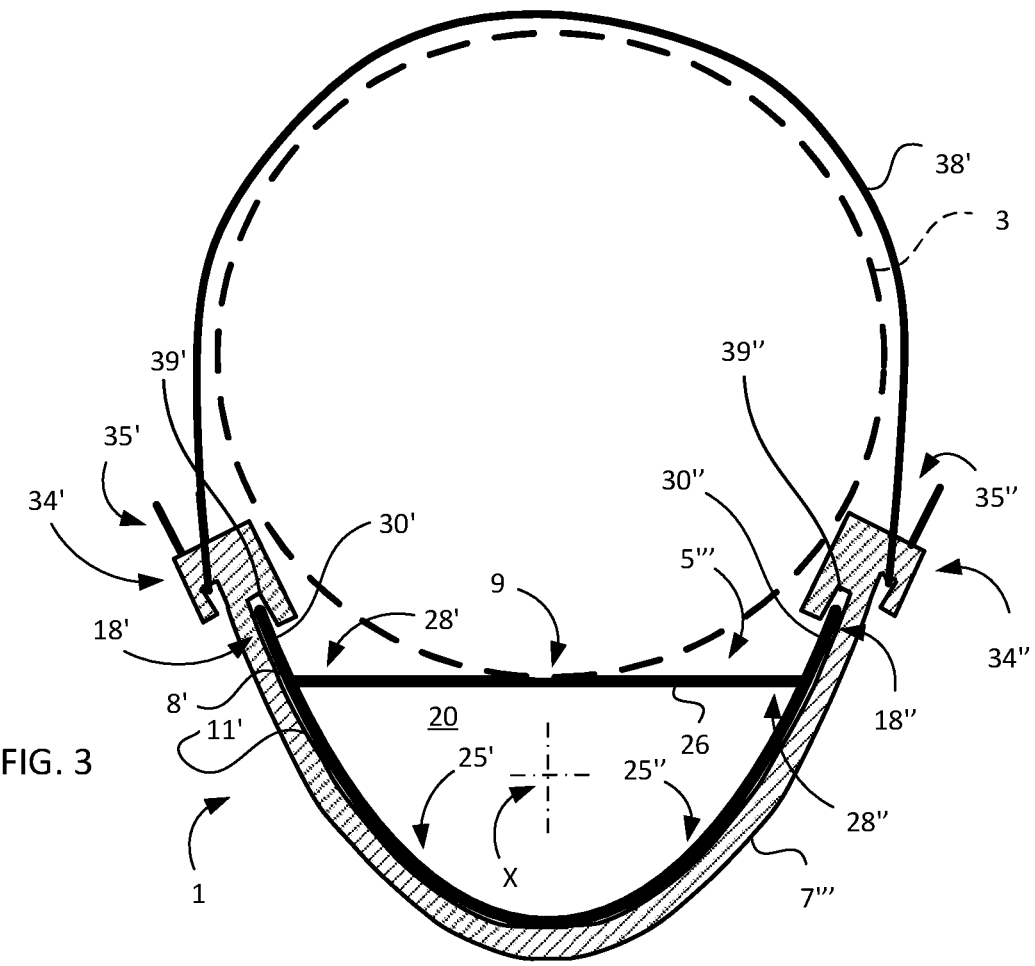
FIG. 3 illustrates in cross-section a fastening device according to a third example.

FIG. 3 illustrates in cross-section a fastener 1 according to a third example. A support arm 5''' of a gas extraction apparatus (not shown) comprises an elongated profile element 9 and is hollow and comprises a cavity 20 extending along a central axis X of the support arm 5'''. The fastener 1 according to this third example is made more elastic and may be formed as a tie band 7''' of elastic material, such as plastic or rubber material.

The elongated profile element 9 may comprise a first and second flange portion 25', 25" and an elongated stiffening web portion 26, which is joined to the respective first and second flange portion 25', 25".

The first and second flange portion 25', 25" may be formed integrally with each other and with the elongated stiffening web portion 26. The elongated stiffening web portion 26 is joined to the first and second flange portion 25', 25" for stiffening the support arm 5'''.

A first and a second end line segment 28', 28" of the elongated stiffening web portion 26 may be arranged adjacent a respective first and second elongated cut edge 18', 18" of the elongated profile element 9 for forming a free first respective second lip end section 30', 30" of the support arm 5'''.

The respective free first and second lip end section 30', 30" may protrude from the respective first and second end line segment 28', 28".

The respective first and second lip end section 30', 30" of the support arm 5''' may be configured to fit respective a first and a second slot 39', 39" of the fastener 1, wherein the first and the second slit 39', 39" being configured for engaging and retaining the fastening device 1 to the support arm 5'''.

A first contour surface 11' of the fastener 1 at least partly may correspond with a portion of the outer cross-sectional profile shape 8' of the support arm 5'''. The first and second slit 39', 39" (corresponding to a first and second retaining portion) are thus configured to engage the respective first and second lip end section 30', 30" of the support arm 5'''.

The fastening device 1 further may comprise a first and second coupling 34', 34" configured to be releasable coupled to respective a first and a second hook 35', 35" of a tube holder strap 38'. The tube holder strap 38' is configured to hold an exhaust tube 3, e.g. configured for ATEX-approved application or other explosive gas extraction application. The exhaust tube 3 may be configured as a flexible and/or corrugated conduit tube.

Figure 4:
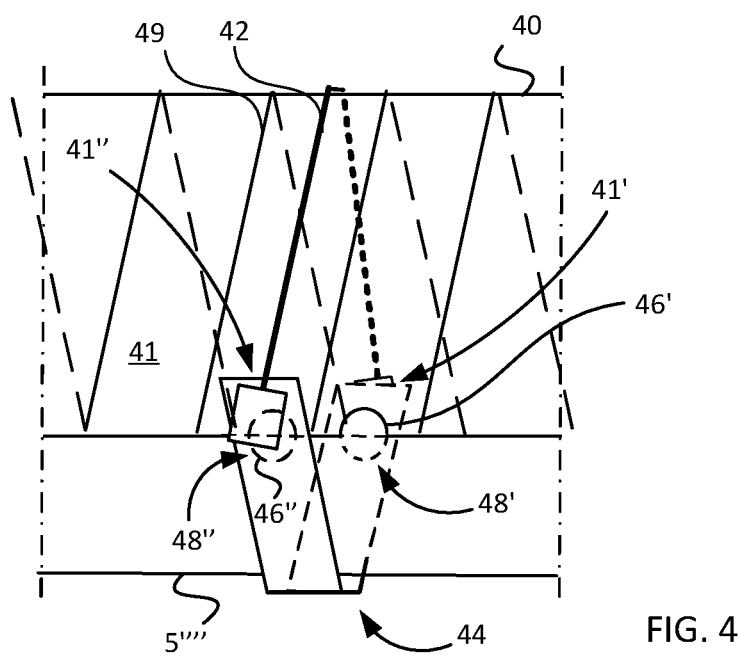
FIG. 4 illustrates a fastening device according to a fourth example.

FIG. 4 illustrates in cross-section a fastener 44 according to a fourth example. An exhaust tube 40 is held to a support arm 5'''' by means of an elastic rubber strip 42 coupled to the fastener 44, which in turn is coupled to the support arm 5'''' and is engaged to the support arm 5'''' via a first 46' and second 46" clamper. The fastener 44 thus comprises a first 48' and second 48" retaining portion configured to retain the fastener 44 to the support arm 5''''. An envelope surface 41 of the exhaust tube 40 comprises at least one helical rill 49 encircling the exhaust tube 40. The elastic rubber strip 42, when mounted, encloses the exhaust tube 40 along the helical rill 49 of the envelope surface 41. The first retaining portion 48' and the second retaining portion 48" of the fastener 44 is oriented relative each other in such way that proper alignment of the elastic rubber strip 42 relative the exhaust tube 40 is achieved, when the elastic rubber strip 42 is coupled to a first coupling 41' and to a second coupling 41" of the fastener 44 and enclosing the envelope surface 41 of the exhaust tube 40.

Figure 5:
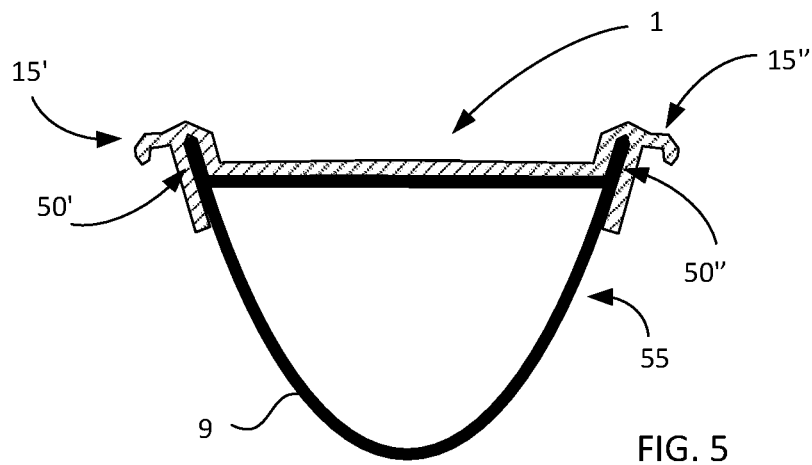
FIG. 5 illustrates a fastening device according to a fifth example configured to be coupled to a support arm arrangement.

FIG. 5 illustrates a fastening device 1 according to a fifth example configured to be coupled to a first 50' and a second 50" lip end section of a support arm 55, which is C-shaped in cross-section. The fastening device 1 is made stiff and is mounted to the support arm 55 by positioning the fastening device 1 at a free end (not shown) of an elongated profile element 9 of the support arm 55 and by sliding the fastening device 1 along the support arm 55 into a desired position on the support arm 55. The fastening device 1 comprises a first 15' and a second 15" hook configured to be releasable coupled to a holding strap (not shown) adapted for holding an exhaust tube (not shown) to the support arm 55.

Figure 6A:
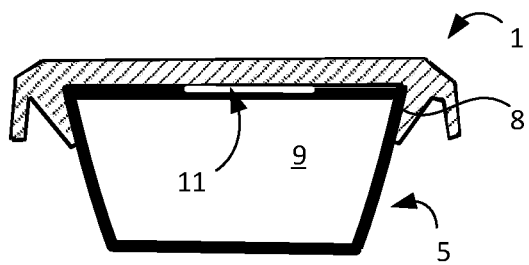
FIGS. 6a-6c illustrate different fastening devices according to further examples.

FIG. 6a illustrates a fastening device 1 according to a further example. The fastening device 1 is made of a stiff material and is mounted onto a hollow exhaust arm 5 by positioning the fastening device 1 at a free end (not shown) of an elongated profile element 9 of the hollow exhaust arm 5 and sliding the fastening device 1 into desired position on the hollow exhaust arm 5. The fastening device 1 comprises a contour surface 11 at least partially corresponding with a cross-sectional profile outer shape 8 of the elongated profile element 9 and partially facing the cross-sectional profile outer shape 8. The fastening device 1 thus exhibits a shape and contour surface 11 configured to fit and partially embrace the cross-sectional profile outer shape 8 of the hollow exhaust arm 5. The contour surface 11 of the fastening device 1 is configured for engaging and retaining the fastening device 1 to the elongated profile element 9, when the fastening device 1 is mounted to the elongated profile element 9.

Figure 6B:
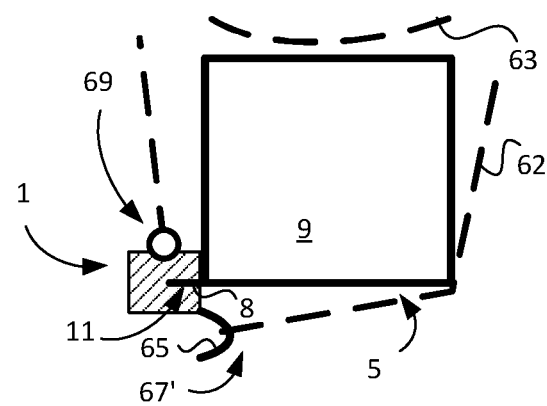

FIG. 6b illustrates a fastening device 1 according to a further example. The fastening device 1 is mounted to an outer shape 8 of an elongated profile element 9 of a hollow exhaust arm 5. The fastening device 1 comprises a contour surface 11 configured to fit and partially embrace a portion of the outer shape 8 of the hollow exhaust arm 5. The fastening device 1 thus exhibits a shape and contour surface 11 configured to fit and partially embrace the cross-sectional profile outer shape 8 of the elongated profile element 9. The contour surface 11 of the fastening device 1 is configured for engaging and retaining the fastening device 1 to the elongated profile element 9 when the fastening device 1 is mounted to the elongated profile element 9. An elastic fastener 62, when mounted, encloses and hold an exhaust tube 63 to the elongated profile element 9. The elastic fastener 62 comprises a first coupling loop 67' configured to be coupled to a hook 65 of the fastening device 1. The other end of the elastic fastener 62 is integrally mounted to the fastening device 1 via a joint 69, but may be releasable mounted thereto.

Figure 6C:
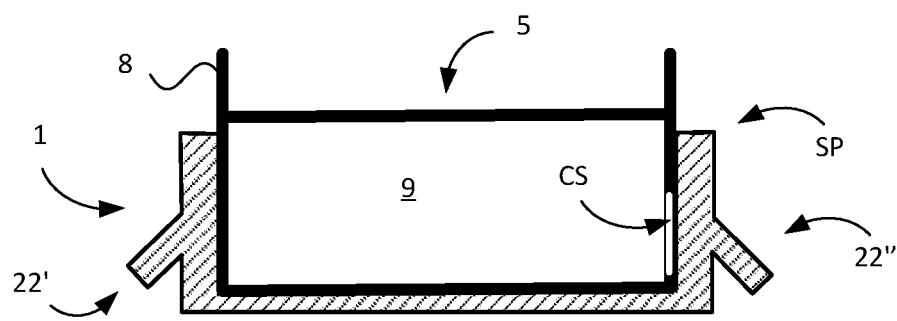

FIG. 6c illustrates a fastening device 1 according to a further example. The a fastening device 1 is configured to be mounted to a support arm 5 of a gas extractor (not shown) for holding an exhaust tube (not shown). The support arm 5 comprises an elongated hollow profile 9. The fastening device 1 is thus configured to be mounted to the support arm 5. The support arm 5 exhibits a cross-sectional profile outer shape 8. The fastening device 1 is configured to hold the exhaust tube by means of a holding element (not shown, e.g. an elastic strap) configured to be coupled to the fastening device 1 and to the exhaust tube by coupling one end of the holder element to a first hook 22' of the fastening device 1 and wrapping the holder element around the exhaust tube envelope surface and coupling the other end of the holder element to a second hook 22". The fastening device 1 comprises a contour surface CS configured to at least partially mate with the cross-sectional profile outer shape 8.

The contour surface CS of the fastening device 1 at least partially may correspond with the cross-sectional outer profile shape 8 of the elongated profile element 9 of the support arm arrangement 5. The contour surface CS is configured for engaging and retaining the fastening device 1 to the elongated profile element 9, when the fastening device 1 is mounted to the elongated profile element 9.

Alternatively, the cross-sectional outer profile shape 8 exhibits an outer shape in cross-section that is at least in one portion wider than the extension of the contour surface CS of the fastening device 1.

Alternatively, said engaging and retaining is achieved by that a support arm surrounding portion SP of the fastening device 1, comprising the contour surface CS, partly clamps against a portion of the elongated profile element 9 and/or fully clamps against the outer surface of the cross-sectional profile shape 8 of the elongated profile element 9.

FIG. 7 illustrates a fastening device 1 according to a sixth example. The fastening device 1 comprises an electrical conductive plate 72 arranged at each hook end. The electrical conductive plate 72 is configured to permit electrical contact between the support arm 5 and the fastening device 1.

The coupling and/or joint and/or abutment between the fastening device 1 and the support arm 5 exhibits a frictional interface by means of any suitable high friction material 77 of the fastening device 1. The friction material 77 may comprise rubber, anti-slip elements, ceramic material or other high friction material for dry contact between the contour surface CS of the fastening device 1 and the cross-sectional profile shape 8 of the support arm 5. In such way is achieved that the fastening device 1 is prevented from slippage along the support arm 5 at the same time as the electrical conductive plate 72 prevents sparking between the support arm 5 and the fastening device 1 in case of static electricity load of the fastening device 1.

Alternatively, said friction material comprises, at least partially or fully, a conductive material for providing electrical contact between the support arm 5 and the fastening device 1.

FIGS. 8a and 8b illustrate a fastening device 1 according to a seventh example. The fastening device 1 comprises a first and second support arm profile engaging and retaining block 81', 81", each coupled to a holding strap 88 configured to hold an exhaust tube (not shown) against a support arm 85, to which the fastening device 1 is coupled. A respective first and second contour surface 811 of each first and second support arm profile engaging and retaining block 81', 81" is configured for engaging and retaining the first and second support arm profile engaging and retaining block 81', 81" to the support arm 85.

In FIG. 8b is shown the first contour surface 811 of the first support arm profile engaging and retaining block 81'. The first support arm profile engaging and retaining block 81' is mounted onto the support arm 85 by positioning the first support arm profile engaging and retaining block 81' at a free end (not shown) of the support arm 85 and sliding, in longitudinal direction, the first support arm profile engaging and retaining block 81' along the support arm 85 into a desired position on the support arm 85. The first contour surface 811' of the support arm first profile engaging and retaining block 81' provides a snug fit with a first free first lip end section 84' of a flange portion 82 of the support arm 85.

The second support arm profile engaging and retaining block 81" is mounted onto the support arm 85 by positioning the second support arm profile engaging and retaining block 81" at said free end and sliding, in longitudinal direction, the second support arm profile engaging and retaining block 81" along the support arm 85 into a desired position adjacent the first support arm profile engaging and retaining block 81' on an opposite free second lip end section 84".

Alternatively, the respective first and second support arm profile engaging and retaining block 81', 81" may be configured to clamp against a portion of the outer surface of the support arm 85.

Figure 9:
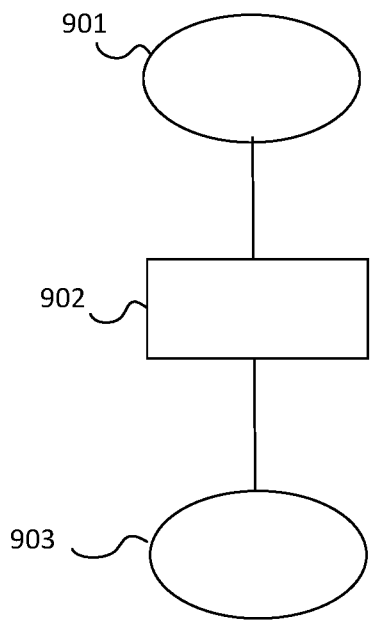
FIG. 9 illustrates a flowchart showing an exemplary method of mounting a fastening device to a support arm arrangement of a gas extractor.

FIG. 9 illustrates an exemplary flowchart showing a method of mounting a fastening device to a support arm arrangement of a gas extractor. The fastening device is configured to be mounted to an elongated profile element of the support arm arrangement. The elongated profile element exhibits a cross-sectional profile shape. The fastening device is configured to hold a tubing member by means of a holding element, configured to be coupled to the fastening device and to the tubing member. The fastening device comprises a contour surface at least partly corresponding with said cross-sectional profile shape, wherein the contour surface is configured for engaging and retaining the fastening device to the elongated profile element when the fastening device is mounted to the elongated profile element. Step 901 in FIG. 9 comprises start of the method. Step 902 comprises implementation of the method. Step 903 comprises stop of the method.

The step 902 may comprise the steps of; providing the fastening device; mounting the fastening device to the elongated profile element by engaging the contour surface to the elongated profile element for retaining the fastening device to the elongated profile element; and coupling the holding element to the tubing member and to the fastening device.

Figure 10:
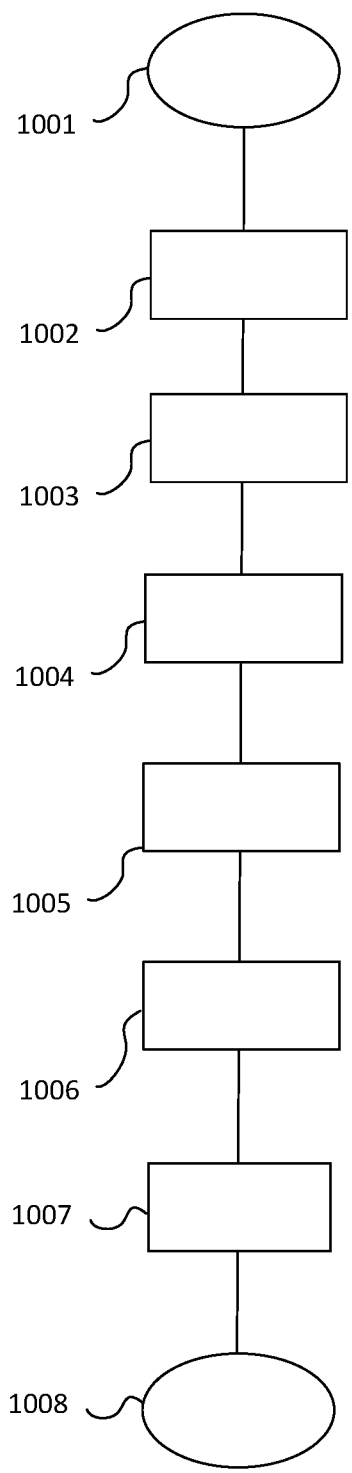
FIG. 10 illustrates a flowchart showing an exemplary method of mounting a fastening device to a support arm arrangement of a gas extractor.

FIG. 10 illustrates an exemplary flowchart showing a method of mounting a fastening device to a support arm arrangement of a gas extractor. The fastening device is configured to be mounted to an elongated profile element of the support arm arrangement. The elongated profile element exhibits a cross-sectional profile shape. The fastening device is configured to hold a tubing member by means of a holding element, configured to be coupled to the fastening device and to the tubing member. The fastening device comprises a contour surface having a contour shape at least partly corresponding with said cross-sectional profile shape, wherein the contour surface is configured for engaging and retaining the fastening device to the elongated profile element when the fastening device is mounted to the elongated profile element. Step 1001 in FIG. 10 comprises start of the method. Step 1002 comprises providing the support arm arrangement of the gas extractor. Step 1003 comprises providing the fastening device. Step 1004 comprises mounting the fastening device to the elongated profile element by leading the fastening device over a free end of the elongated profile element. Step 1005 comprises engaging the contour surface of the fastening device to the elongated profile element for retaining the fastening device to the elongated profile element by sliding the fastening device along the elongated profile element 9 into position.

Step 1006 may comprise coupling a first end of the holding element to the fastening device.

Step 1004 may comprise encircling the holding element around an envelope surface of the tubing member.

The encircling of the holding element around the tubing member may be performed in an imaginary plane oriented transverse a longitudinal direction of the tubing member, which longitudinal direction extends parallel with the central axis of the elongated profile element when the tubing member is mounted to the support arm arrangement, or substantially in said imaginary plane.

Step 1007 may comprise coupling a second end of the holding element to the fastening device.

In such way is achieved simple and safe coupling of the tubing member to the support arm arrangement. The fastening device thus being securely and easily mounted to the support arm arrangement and will be safely attached to the support arm arrangement.

In such way is achieved in a simple way that the holding element can be coupled to the fastening device and the encircling of the holding element can be performed in a safe way, by that service personnel can concentrate on the coupling of the holding element around the tubing member, while the fastening device is securely fasten to the support arm arrangement.

In such way is achieved that the holding element can be demounted and mount in a safe way and in a cost-effective way promoting cleaning and service of the support arm arrangement Alternatively, the step of coupling the holding element to the fastening device is made before the step of mounting the fastening device to the elongated profile element.

Alternatively, the step of coupling the holding element to the fastening device is partly performed by integrally coupling one end of the holding element to the fastening device.

Step 1008 comprises the stop of the method.

The present invention is of course not in any way restricted to the preferred examples described above, but many possibilities to modifications, or combinations of the described examples thereof, should be apparent to a person with ordinary skill in the art without departing from the basic idea of the invention as defined in the appended claims.

The invention claimed is:

1. A fastening device configured to be mounted to an elongated profile element of a support arm arrangement, the elongated profile element of the support arm arrangement exhibiting a cross-sectional profile shape, the fastening device is configured to hold a tubing member by a holding element, configured to be coupled to the fastening device and to the tubing member the fastening device comprising:
   a contour surface having a contour at least partly corresponding with said cross-sectional profile shape of the elongated profile element, wherein the contour surface is configured for engaging and retaining the fastening device to the elongated profile element when the fastening device is mounted to the elongated profile element; and
   a first coupling member that protrudes outward from the contour surface and is configured to be releasably coupled to a first coupling element of the holding element,
   wherein the contour surface comprises a first gripping surface and a second gripping surface each configured to retain and engage the fastening device to the support arm arrangement.

2. The fastening device according to claim 1, where the contour is configured to clamp around the support arm arrangement and/or to embrace the cross sectional profile shape of the support arm arrangement.

3. The fastening device according to claim 1, wherein the fastening device is formed with a first hook member comprising the first gripping surface, which first hook member is configured to engage a first flange or a free first lip end section of the cross-sectional profile shape.

4. The fastening device according to claim 3, wherein the first hook member encapsulates a first free edge of the elongated profile element.

5. The fastening device according to claim 1, wherein the second gripping surface is configured to engage a second flange or a free second lip end section of the cross-sectional profile shape.

6. The fastening device according to claim 5, wherein the fastening device is formed with a second hook member comprising the second gripping surface, wherein the second hook member is configured to engage a second flange of the cross-sectional profile shape.

7. The fastening device according to claim 1, wherein the contour surface of the fastening device comprises a non-conductive material for avoiding sparking between the support arm arrangement and the fastening device.

8. The fastening device according to claim 1, further comprising an electrical conductive plate arranged for permitting electrical contact between the support arm arrangement and the fastening device.

9. A method of mounting a fastening device to a support arm arrangement, wherein the fastening device is configured to be mounted to an elongated profile element of the support arm arrangement exhibiting a cross-sectional profile shape, the fastening device is configured to hold a tubing member by a holding element, configured to be coupled to the fastening device and to the tubing member, wherein the fastening device comprises a contour surface at least partly corresponding with said cross-sectional profile shape, wherein the contour surface is configured for engaging and retaining the fastening device to the elongated profile element when the fastening device is mounted to the elongated profile element, the method comprising the steps of:
   providing the fastening device;
   mounting the fastening device to the elongated profile element by engaging the contour surface to the elongated profile element, the contour surface being configured to retain the fastening device to the elongated profile element; and
   coupling the holding element to the tubing member and to the fastening device by releasably coupling a first coupling member of the fastening device that protrudes outward from the contour surface to a first coupling element of the holding element, wherein the contour surface comprises a first gripping surface and a second gripping surface each configured to retain and engage the fastening device to the support arm arrangement.

10. The method according to claim 9, wherein the method step of mounting the fastening device to the elongated profile element comprises the further step of leading the fastening device over a free end of the elongated profile element and sliding the fastening device along the elongated profile element into position.

11. The method according to claim 9, wherein the method step of mounting the fastening device to the elongated profile element comprises snapping the fastening device to the elongated profile element.

\* \* \* \* \*